Dec. 31, 1935.   O. W. DECHAU   2,026,273

NOSE PAD SUPPORT FOR EYEGLASS AND SPECTACLE FRAMES

Filed Dec. 27, 1934

INVENTOR
OTTO W. DECHAU
BY
ATTORNEY

Patented Dec. 31, 1935

2,026,273

UNITED STATES PATENT OFFICE 2,026,273

NOSE PAD SUPPORT FOR EYEGLASS AND SPECTACLE FRAMES

Otto W. Dechau, Rochester, N. Y., assignor to Artcraft Optical Co., Rochester, N. Y.

Application December 27, 1934, Serial No. 759,378

3 Claims. (Cl. 88—49)

This invention relates to eye-glass or spectacle mountings and more particularly to the construction of the nose guard thereof and has for its object to provide a simplified mounting for the nose pads.

Another object of this invention is to so construct the nose guard that the nose pads can be removably anchored thereto and readily interchanged thereon.

A further object of this invention is to so construct the nose guard that the nose pads have a limited rocking movement thereon in a lengthwise direction.

All these and other objects and attendant advantages will become more readily apparent from the detailed description of the invention which follows, reference being had to the accompanying drawing in which Figure 1 is an enlarged end elevation of a nose pad and its mounting constructed in accordance with my invention.

In the several figures of the drawing like reference numerals indicate like parts.

Figure 1:
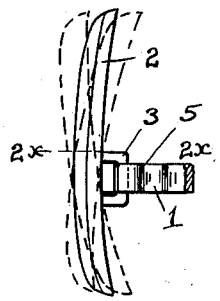

The nose pad support is provided at the end of the guard arm 1 which is preferably of rectangular cross section although any other cross section may be used for the guard arm without departing from the scope and spirit of this invention. The mounting for the nose pad 2 is provided by a sleeve 3 which is suitably fastened to the metal core 4 and projects from the inside of the nose pad so as to permit the end of the nose guard to engage thereinto and extend therethru. The inside dimensions of the sleeve 3 are slightly larger than the corresponding dimensions of the outside of the end of the guard arm in order that the sleeve and with it the nose pad can rock on the nose guard as indicated in dotted lines in Figure 1.

The mounting of the nose pad 2, provided by the sleeve 3, is removably held anchored to the nose guard by means of the bendable prong 5, the inner end of which is soldered or welded to the side of the guard arm 1. This prong 5 is bent so as to provide a shoulder or stop 6 at the inner end and then extend forwardly along the inside of the guard arm 1 suitably spaced therefrom. The outer free end of the prong 5 is bent inwardly toward the guard arm to provide another shoulder or stop 7 thereon.

Figure 4:
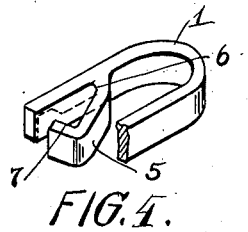
Figure 4 is a detail perspective view of one of the nose pad supports.
Figure 2:
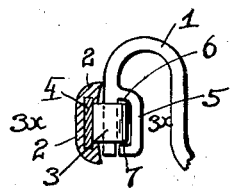
Figure 2 is a horizontal sectional view thereof, taken on the line 2x—2x of Figure 1.
Figure 5:
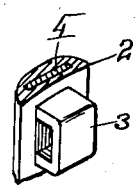
Figure 5 is a detail perspective view of a portion of one of the nose pads and its bearing.
Figure 3:
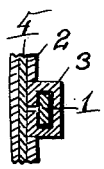
Figure 3 is a vertical sectional view of the nose pad mounting, the section being taken on the line 3x—3x of Figure 2.

In fastening a nose pad to the guard arm 1, the prong 5 is bent or pried away from the outer end thereof as illustrated in Figure 4 so as to permit the mounting sleeve 3 of the nose pad to telescope over the end of the guard arm and rest against the inner shoulder 6 of the prong 5. The prong is then bent back toward the guard arm until its outer free end comes into substantial contact with the side of the guard arm. The prong and the end of the guard arm then enclose one side of the sleeve 3 and hold the nose pad locked to the nose guard.

When it is desired to remove the nose pad, the prong 5 is pried away from the end of the nose guard to open the loop formed by the prong and the guard arm so as to permit the sleeve 3 to readily slide off the guard arm as the nose pad is pulled away therefrom. A new nose pad may then be replaced thereon and locked thereto in the manner set forth above.

I claim:

1. In an eye glass mounting, a nose pad having a tubular bearing projecting rearwardly therefrom with its axis substantially parallel with the rear face of the pad transversely thereof, a supporting arm for said pad provided at its end with a substantially rectangular frame positioned substantially at right angles to the rear face of said pad, said frame being split at the inner corner of the outer end of said frame so as to make the outer portion bendable toward and away from the inner side thereof with the free end of the outer portion of the frame abutting against the inside of the adjacent inner portion of the frame and the tubular bearing supported on the inner portion of said frame between the open and closed end of the frame.

2. In an eye glass mounting as set forth in claim 1 in which said tubular bearing has a rectangular cross section and said supporting arm and frame formed theeron is made up of stock of rectangular cross section to have said bearing loosely rock thereon with the inside of the frame providing stops for a limited rocking motion of said bearing and its pad on said frame.

3. In an eyeglass mounting, a nose pad having a tubular bearing projecting rearwardly thereof with its axis substantially parallel with the rear face of the pad, a supporting arm, a loop formed on said supporting arm with a supporting bearing for the tubular bearing of the nose pad provided on a portion of the loop, said loop being separated to provide a bendable portion of the loop substantially parallel to said tubular bearing with its free end bent to abut against the side of the remaining portion of the loop so as to provide a fixed stop for the free end of the bendable portion of the loop to keep the loop of substantially uniform dimensions after opening and again closing the loop when replacing a pad thereon thereby preventing a clinching of the tubular bearing in the loop.

OTTO W. DECHAU.